United States Patent
Park et al.

(10) Patent No.: US 12,553,094 B2
(45) Date of Patent: *Feb. 17, 2026

(54) PHYSICALLY PRETREATED BIOMASS COMPOSITION CAPABLE OF MEMBRANE FILTRATION

(71) Applicant: CJ CHEILJEDANG CORPORATION, Seoul (KR)

(72) Inventors: Jeungyil Park, Seoul (KR); Youngran Kim, Seoul (KR); Myeongsu Jang, Seoul (KR); Dongiun Seo, Seoul (KR); Hansol Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 760 days.

This patent is subject to a terminal disclaimer.

(21) Appl. No.: 16/968,739

(22) PCT Filed: May 31, 2018

(86) PCT No.: PCT/KR2018/006254
§ 371 (c)(1),
(2) Date: Aug. 10, 2020

(87) PCT Pub. No.: WO2019/231025
PCT Pub. Date: Dec. 5, 2019

(65) Prior Publication Data
US 2021/0002734 A1  Jan. 7, 2021

(30) Foreign Application Priority Data
May 28, 2018  (KR) .......... 10-2018-0060588

(51) Int. Cl.
*C13K 1/04* (2006.01)
*B01D 61/14* (2006.01)
(Continued)

(52) U.S. Cl.
CPC .............. *C13K 1/04* (2013.01); *B01D 61/147* (2013.01); *B01D 65/08* (2013.01); *B02C 19/005* (2013.01); *B02C 23/10* (2013.01); *C08L 97/02* (2013.01)

(58) Field of Classification Search
CPC ........ C13K 1/04; B01D 61/147; B01D 65/08; B01D 63/08; B01D 61/14; B02C 19/005;
(Continued)

(56) References Cited

U.S. PATENT DOCUMENTS

2010/0281759 A1* 11/2010 Yanik ................. C10L 9/083
422/198
2016/0040354 A1*  2/2016 Hallett ................ D21C 3/024
162/76
(Continued)

FOREIGN PATENT DOCUMENTS

EP       2843061 A1    3/2015
JP       5901128 B2    4/2016
(Continued)

OTHER PUBLICATIONS

Extended European Search Report issued in corresponding European Patent Application No. 18920384.7 dated Mar. 26, 2021.
(Continued)

*Primary Examiner* — Ekandra S. Miller-Cruz
(74) *Attorney, Agent, or Firm* — Morgan, Lewis & Bockius LLP

(57) ABSTRACT

The present disclosure relates to a physically pretreated biomass composition capable of membrane filtration treatment in a biomass solid-liquid separation process, and a method for preparing sugar therefrom.
The physically pretreated biomass composition is very useful for the biomass treatment process because MF clogging phenomena do not occur through specific physical pretreatment (attrition milling) of herbaceous biomass and because MF passage speed is improved such that MF can be used in the biomass solid-liquid separation process.

16 Claims, 8 Drawing Sheets

(51) Int. Cl.
  *B01D 65/08*     (2006.01)
  *B02C 19/00*     (2006.01)
  *B02C 23/10*     (2006.01)
  *C08L 97/02*     (2006.01)

(58) Field of Classification Search
  CPC ......... B02C 23/10; B02C 23/16; C08L 97/02; Y02E 50/10; C10G 31/09; C10G 2300/1014; C10L 1/02
  USPC .......................................................... 127/43
  See application file for complete search history.

(56) References Cited

U.S. PATENT DOCUMENTS

2017/0275385 A1* 9/2017 Capanema .............. C09J 161/06
2018/0066293 A1* 3/2018 Charron .................. C08L 97/02

FOREIGN PATENT DOCUMENTS

| KR | 10-2014-0033026 | A | 3/2014 | |
| KR | 10-2014-0080620 | A | 7/2014 | |
| KR | 10-2015-0051325 | A | 5/2015 | |
| KR | 10-2015-0076523 | A | 7/2015 | |
| WO | 2010/025171 | A1 | 3/2010 | |
| WO | WO-2010135366 | A1 * | 11/2010 | ................ C12P 7/06 |
| WO | 2014/144565 | A1 | 9/2014 | |

OTHER PUBLICATIONS

Kim et al., "Comparison of Milling Modes as a Pretreatment Method for Cellulosic Biofuel Production," Journal of Clean Energy Technologies, 1 (1): 45-48 (2013).

International Search Report issued in corresponding International Patent Application No. PCT/KR2018/006254 dated Feb. 22, 2019.

* cited by examiner

[FIG. 1]
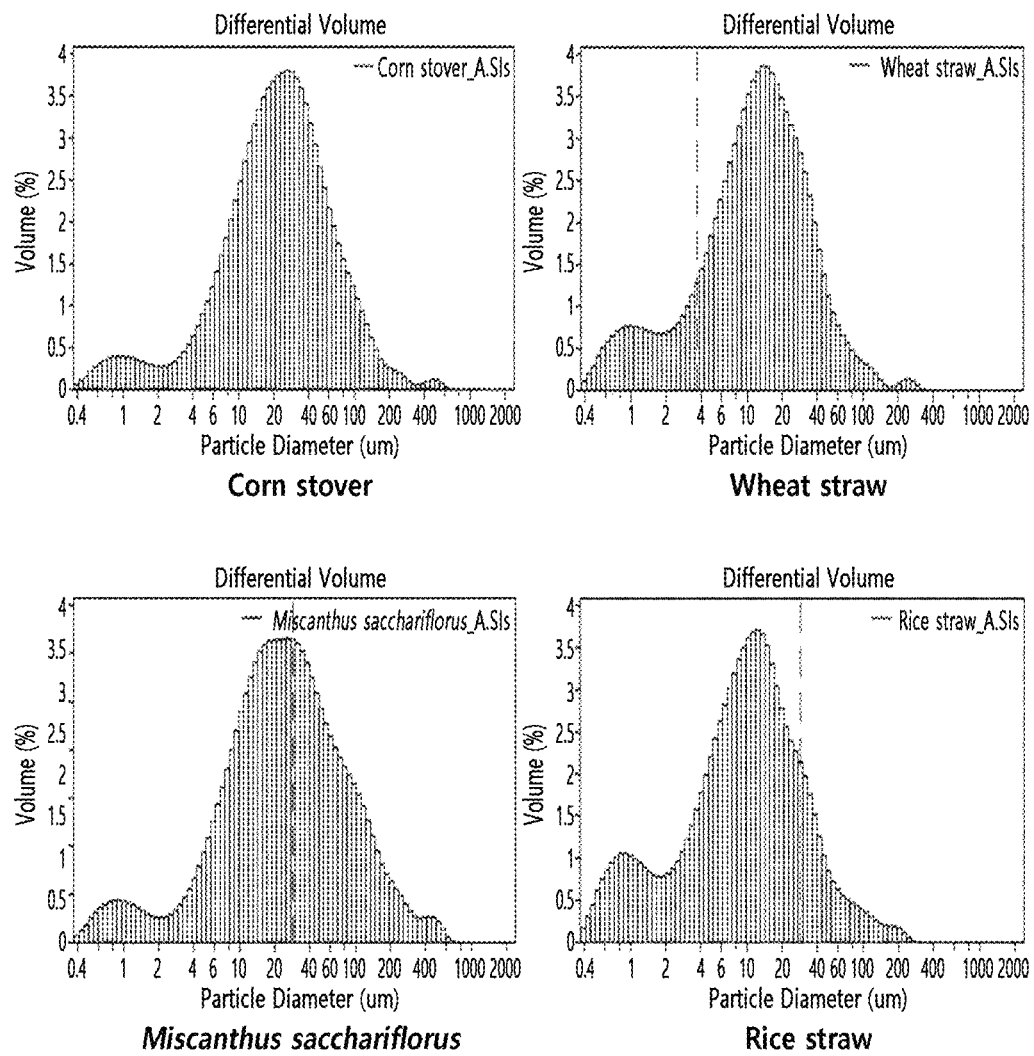

[FIG. 2]
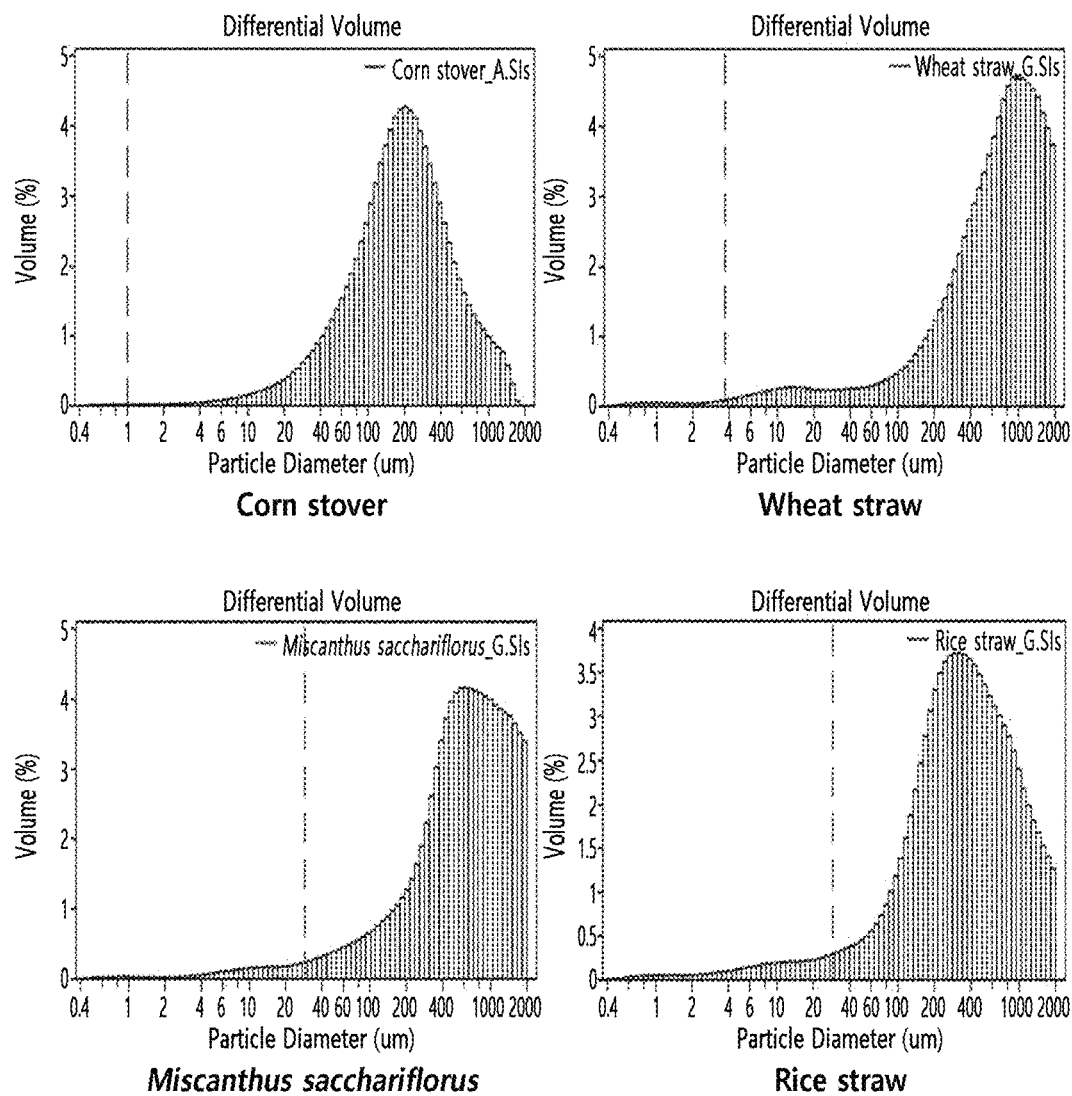

[FIG. 3]
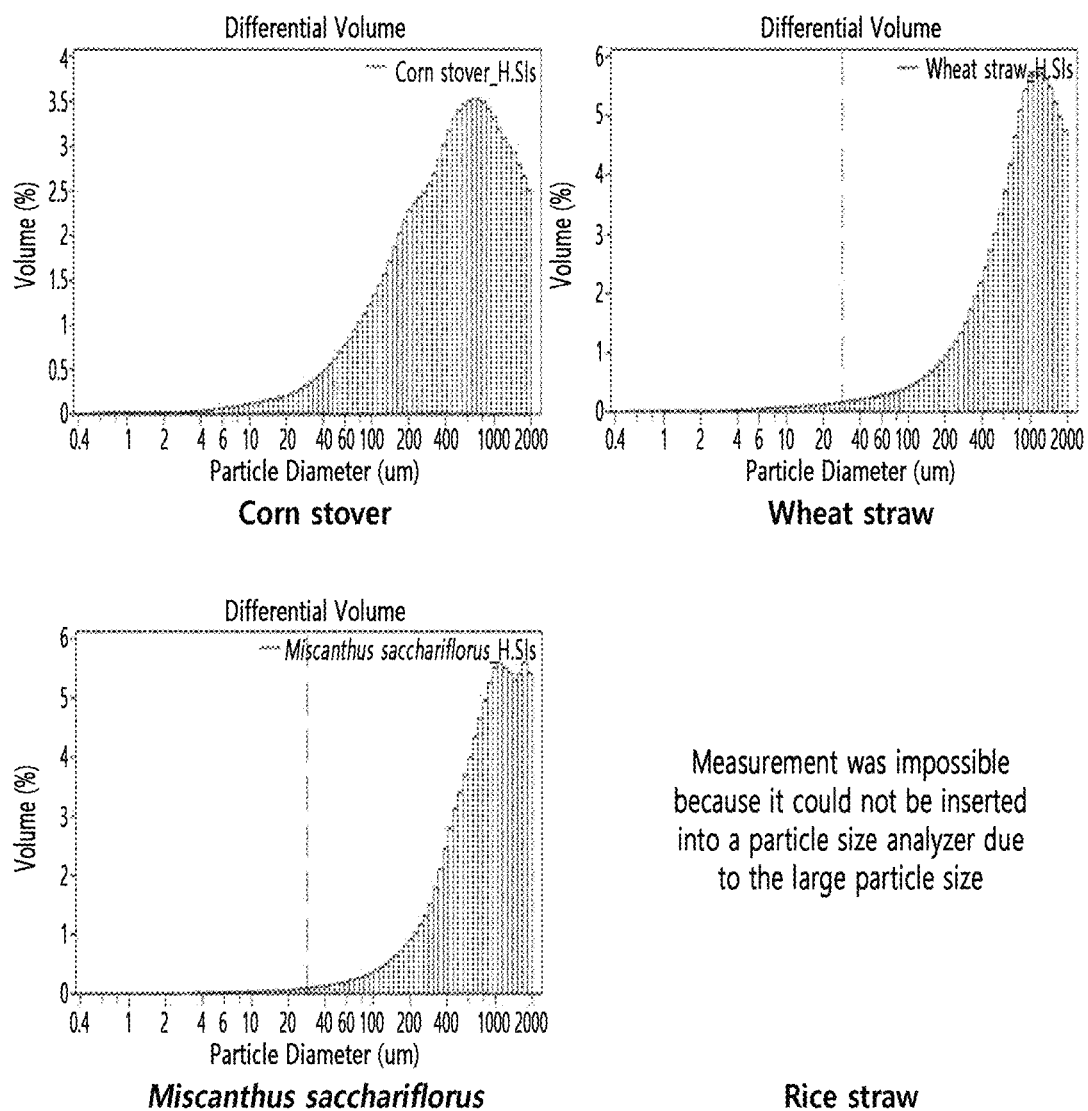

[FIG. 4]
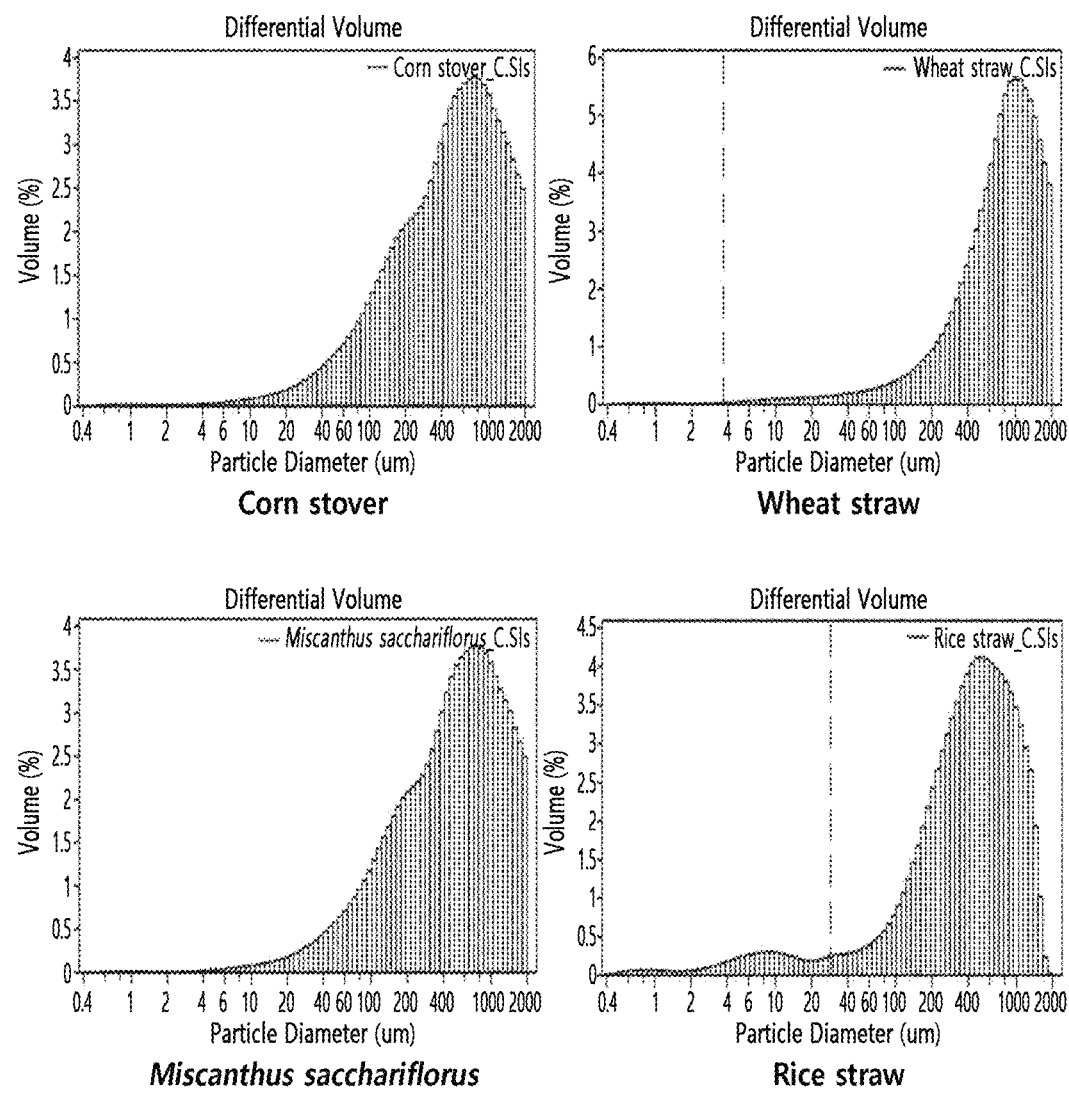

[FIG. 5]
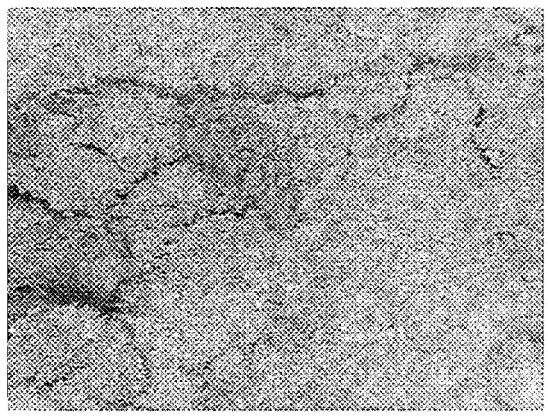
Attrition milling
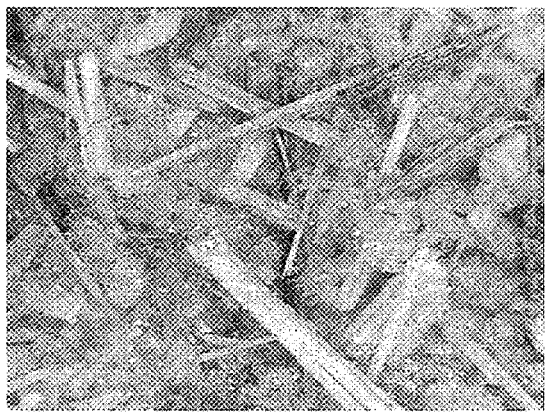
Grinder milling
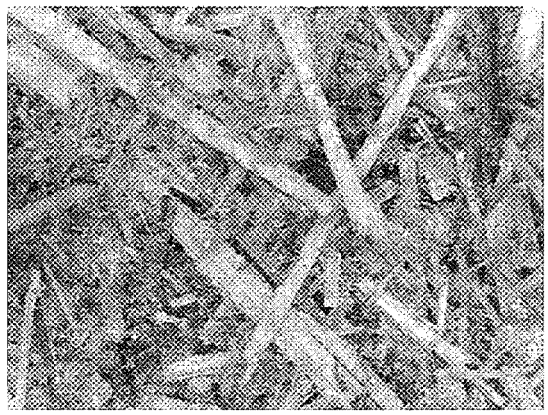
Hammer milling
Cutter milling

[FIG. 6]
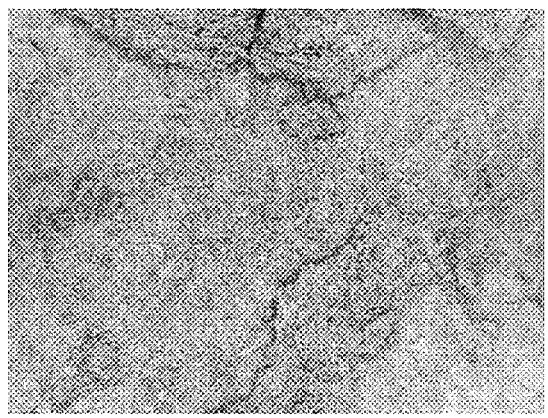
Attrition milling
Grinder milling
Hammer milling
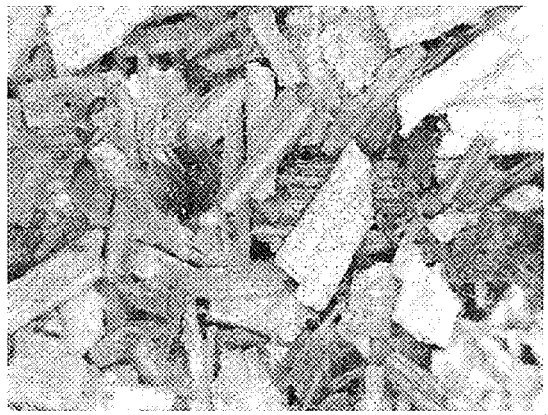
Cutter milling

[FIG. 7]
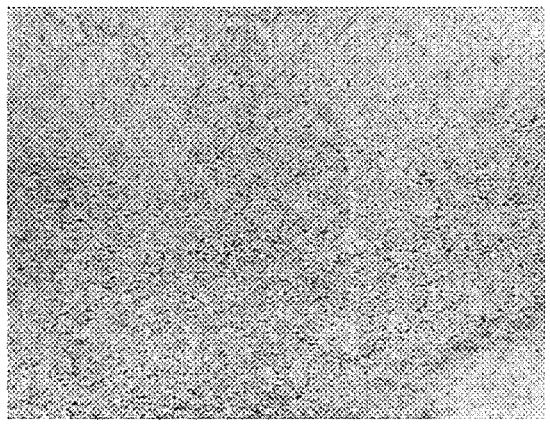
Attrition milling
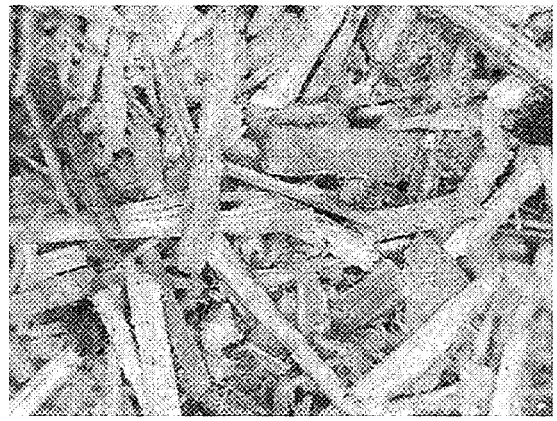
Grinder milling
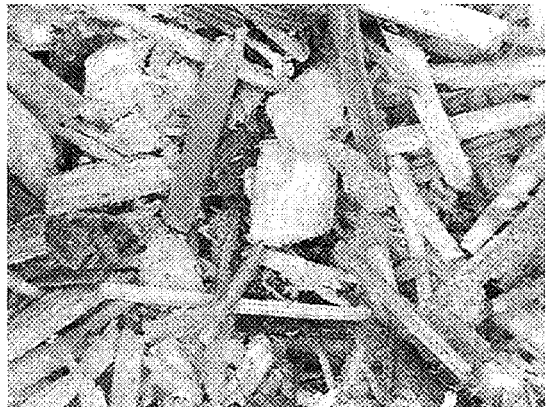
Hammer milling
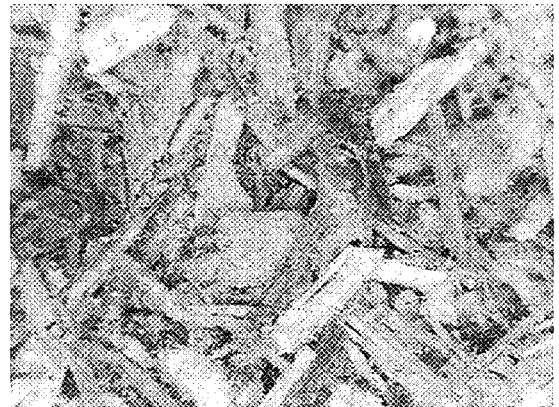
Cutter milling

[FIG. 8]
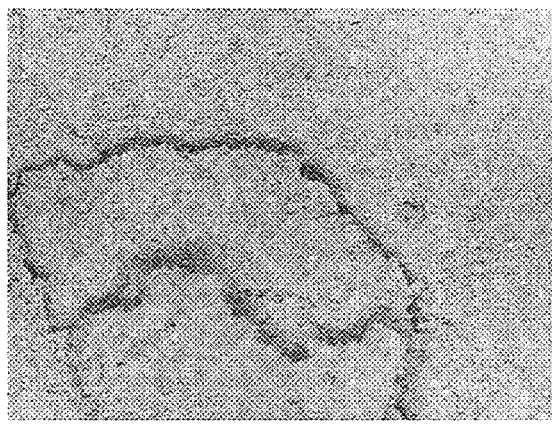
Attrition milling
Grinder milling
Hammer milling
Cutter milling

PHYSICALLY PRETREATED BIOMASS COMPOSITION CAPABLE OF MEMBRANE FILTRATION

TECHNICAL FIELD

The present disclosure relates to a physically pretreated biomass composition capable of membrane filtration treatment in a biomass solid-liquid separation process, and a method for preparing sugar therefrom.

BACKGROUND ART

Lignocellulosic biomass is composed of a non-degradable structure of cellulose, hemicellulose, and lignin. In order to use lignocellulosic biomass as a sustainable supply source of biofuels and biochemicals, it must be economically converted into useful intermediates such as sugar. It can be converted into fermentable sugar after passing through physical pretreatment, chemical pretreatment, and biological pretreatment that are suitable for lignocellulosic biomass properties.

The above pretreatment processes are an essential step in converting lignocellulosic biomass to sugar, but they have the highest operating cost among all processes. The pretreatment process is a reaction between solid biomass and a liquid (water, solvent or enzyme, and microorganisms), and washing and solid-liquid separation before and after each step of the pretreatment process are essential. That is, typical processes for the production of ethanol from biomass include at least two or more solid-liquid separation steps. Thus, solid-liquid separation can be a key process step when biomass is used as a raw material, which can be a major cause of biomass pretreatment costs. In addition, inefficient separation has negative effects for the economic feasibility of processes and final yield.

Characteristics such as a particle size, a solid concentration, and a viscosity of biomass affect separation efficiency. For biomass solid-liquid separation, in general, filtration, sedimentation, and centrifugation can be used, and centrifugation requires high investment and operating costs, and efficiency washing is impossible for the sedimentation process, and after solid-liquid separation, the dehydration rate is low, which causes the final yield to drop, and thus, centrifugation and sedimentation must be avoided during solid-liquid separation.

Membrane filtration requires a relatively low energy input, has high selectivity, and is widely used because it can be simply used over a wide temperature range without additional addition of chemicals (adjuvants), and from the standpoint of investment and operating costs, membrane filtration is suitable for solid-liquid separation/washing of biomass.

It is generally known that a wide particle size distribution and a low density (0.12 g/mL to 0.18 g/mL) are not suitable for membrane filtration. Herbaceous biomass has a significantly low and unique density (0.2 g/mL or less), and due to the needle-shaped particle after physical pretreatment (grinding) and inherent fibril, membrane clogging phenomena occur during membrane filtration. Due to these characteristics, there was a problem of increased investment costs due to over design of the solid-liquid separation system and increased operating costs due to a short membrane replacement cycle. In addition, since this clogging phenomenon generated frequent process troubles, there was a problem of choosing centrifugation.

DISCLOSURE

Technical Problem

In order to solve the problems above, biomass treatment methods using various physical pretreatment methods are being studied, and Korean Patent No. 10-1171922 discloses a process of reducing the size of initial biomass by stone grinding, mechanical ripping, tearing, and pin grinding for the pretreatment of biomass and then decomposing biomass through electron beam irradiation. However, in this case, two pretreatment processes are performed, and above all, electron beam irradiation has high energy consumption, and thus there is a problem in that it consumes more energy than the energy generated through actual biomass decomposition, and therefore a solution therefor is required.

Technical Solution

An object of the present disclosure is to provide a physically pretreated biomass composition, comprising a particle size distribution wherein D10 is 1 μm to 10 μm, D50 is 10 μm to 30 μm, and D90 is 30 μm to 120 μm.

Another object of the present disclosure is to provide a method for producing sugar from biomass, comprising (a) a pretreatment step comprising physical pretreatment of biomass; and (b) a step of converting the pretreated biomass composition to sugar, which is subjected to solid-liquid separation by membrane filtration.

Advantageous Effect

The physically pretreated biomass composition of the present disclosure is very useful for the biomass treatment process because clogging phenomena do not occur during membrane filtration through specific physical pretreatment (attrition milling) of herbaceous biomass and because passage speed is improved such that a membrane filtration method can be used in the biomass solid-liquid separation process.

BRIEF DESCRIPTION OF DRAWINGS

FIG. 1 is a particle size distribution graph of an attrition milling-treated biomass composition.

FIG. 2 is a particle size distribution graph of a grinder milling-treated biomass composition.

FIG. 3 is a particle size distribution graph of a hammer milling-treated biomass composition.

FIG. 4 is a particle size distribution graph of a cutter milling-treated biomass composition.

FIG. 5 shows the particle shape of a corn stover biomass composition after physical pretreatment.

FIG. 6 shows the particle shape of a wheat straw biomass composition after physical pretreatment.

FIG. 7 shows the particle shape of a *Miscanthus sacchariflorus* biomass composition after physical pretreatment.

FIG. 8 shows the particle shape of a wheat straw biomass composition after physical pretreatment.

BEST MODE FOR CARRYING OUT THE INVENTION

Hereinafter, the present disclosure will be described in detail.

Meanwhile, each description and embodiment disclosed in the present disclosure may be applied to each other description and embodiment. That is, all combinations of the various elements disclosed in this application fall within the scope of the present disclosure. In addition, it cannot be said that the scope of the present disclosure is limited by the specific descriptions described below. In addition, those skilled in the art can recognize or identify a number of equivalents for a particular aspect described in the present disclosure using only conventional experimentation. In addition, such equivalents are intended to be included in the present disclosure.

An aspect of the present disclosure to achieve the above objects provides a physically pretreated biomass composition, comprising a particle size distribution wherein D10 is 1 μm to 10 μm, D50 is 10 μm to 30 μm, and D90 is 30 μm to 120 μm.

As used herein, the term "biomass" collectively refers to plants, which synthesize organic matter by receiving solar energy, and biological organisms such as animals, microorganisms, etc. using plants as food, and in ecological perspective, biomass refers to all species belonging to biological organisms or one species of animals and plants expressed in biomass within a unit area or unit volume of habitat. In addition, biomass is generally irrelevant to life and death and is used in a broad sense, and biomass includes cedar wood, charcoal, biogas, etc., and in industry, organic waste is also included in biomass.

The biomass is largely classified as cultivation resource-based or waste resource-based biomass depending on the raw material, and the cultivation resource-based biomass can be classified into sugar-based, starch-based, cellulose-based, carbohydrate-based, oil-based, freshwater-based, marine-based, microbe-based, etc. depending on the origin. The biomass of the physically pretreated biomass composition of the present disclosure may be cellulose-based biomass including tree-based, herbaceous-based, and pasturage-based biomass, and may be specifically herbaceous biomass, bus it not limited thereto.

In addition, as used herein, the term "herbaceous biomass" collectively refers to rice, leguminous crops, and remnants thereof used for the production of food or feed other than trees growing on grassland, and for example, the herbaceous biomass may be derived from corn stover, wheat straw, *Miscanthus sacchariflorus*, or rice straw, but is not limited thereto.

As used herein, the term "pretreatment" collectively refers to a process that allows improving the rate and yield of biomass enzyme hydrolysis. The ultimate purpose of pretreatment is to increase the accessibility of enzymes by reducing the crystallinity of non-degradable structures of cellulose, etc., and to increase the amount of effective enzymes by increasing the specific surface area of biomass. Since the production cost of biofuel is determined according to the degree of efficiency of the pretreatment process, the pretreatment process is regarded as an essential step for converting biomass to biofuel.

The pretreatment method can be largely divided into physical, chemical, and biological methods according to the treatment method. Representative physical methods include milling or steam explosion; chemical methods include dilute acid pretreatment and soaking in aqueous ammonia (SAA), and ammonia recycled percolation (ARP) which use ammonia as a catalyst; and biological methods include methods using microorganisms such as molds, etc.

The physical pretreatment method of the present disclosure may be the milling treatment of biomass, and the milling may include one or more milling treatments of attrition milling, grinder milling, hammer milling, or cutter milling. Specifically, the physical pretreatment may include the attrition milling treatment using attrition mill, but is not limited thereto.

For the purpose of the present disclosure, the biomass composition may refer to the one that is physically pretreated, and then a composition that is suitable for membrane filtration in a solid-liquid separation process may be provided.

As described above, the average particle size and particle size distribution of the biomass composition treated by attrition mill have significantly lower values than those of the biomass composition that is physically treated in other manners, and thus the passage rate is fast during membrane filtration.

As used herein, the term "particle size" refers to the size of powder and granule, and unlike the particle diameter which usually represents the size of a particle as a diameter, the particle size also includes indirect indications such as specific surface area, etc. In case of a perfect spherical shape, a simple relationship is established between the particle diameter and other particle sizes, but it is generally difficult to determine the particle size in one word, and it is expressed as any average representative length, such as an average diameter (average value of lengths in two or more directions) or an equivalent diameter (assuming that a polyhedron is of some simple shape and has a representative length).

The particle size distribution can be measured by measuring the minimum size, maximum size, and average value of a sample using a particle size analyzer. Meanwhile, the particle size distribution of a sample cannot be accurately determined only by the average value of the particle size, and if the particle size values corresponding to 10%, 50%, and 90% of the largest particle size in the cumulative distribution of particle sizes are expressed as D10, D50, and D90, respectively, and if the particle size distribution curve is defined based on the above values, then the particle size distribution of a sample can be accurately expressed.

The particle size distribution of the physically pretreated biomass of the present disclosure may specifically be that D10 is 0.5 μm to 20 μm, 0.5 μm to 15 μm, 0.5 μm to 10 μm, 1 μm to 20 μm, 1 μm to 15 μm, or 1 μm to 10 μm, D50 is 5 μm to 40 μm, 5 μm to 35 μm, 5 μm to 30 μm, 10 μm to 40 μm, 10 μm to 35 μm, or 10 μm to 30 μm, and that D90 is 20 μm to 130 μm, 20 μm to 125 μm, 20 μm to 120 μm, 30 μm to 130 μm, 30 μm to 125 μm, or 30 μm to 120 μm, but is not limited thereto.

In addition, the average particle size of the physically pretreated biomass of the present disclosure may specifically be 5 μm to 80 μm, 5 μm to 70 μm, 5 μm to 60 μm, 5 μm to 50 μm, 10 μm to 80 μm, 10 μm to 70 μm, 10 μm to 60 μm, 10 μm to 50 μm, or 15 μm to 50 μm, but is not limited thereto.

For example, in the present disclosure, since the biomass composition that is physically pretreated through attrition milling treatment has a low average particle size value and narrow particle size distribution, it may increase the flux upon membrane filtration compared to biomass compositions that have been physically pretreated in other manners.

In addition, the density of the biomass composition of the present disclosure may be 0.4 g/mL to 0.6 g/mL.

As used herein, the term "density" is a value obtained by dividing the mass of a substance by its volume, and each substance has a unique value. For the unit of density, g/mL, $g/cm^3$, etc. are mainly used, and the density may specifically be 0.35 g/mL to 0.7 g/mL, 0.35 g/mL to 0.65 g/mL, 0.35 g/mL to 0.6 g/mL, 0.4 g/mL to 0.7 g/mL, 0.4 g/mL to 0.65 g/mL, 0.4 g/mL to 0.6 g/mL, 0.45 g/mL to 0.7 g/mL, 0.45 g/mL to 0.65 g/mL, 0.45 g/mL to 0.6 g/mL, 0.5 g/mL to 0.7 g/mL, 0.5 g/mL to 0.65 g/mL, or 0.5 g/mL to 0.6 g/mL, but is not limited thereto.

In addition, the physically pretreated biomass composition of the present disclosure may have a uniform particle shape and may be one in which a fibril structure is disappeared.

For example, unlike biomass compositions that are physically pretreated in another method, the biomass composition treated by attrition milling has a uniform particle shape and the fibril structure unique to herbaceous biomass is not observed, and thus solid-liquid separation processes may be performed for biomass compositions treated by attrition milling through membrane filtration.

In addition, the physically pretreated biomass composition of the present disclosure may include glucose, xylose, lignin, and ash, and may additionally include mannose, galactose, arabinose, etc.

Specifically, based on 100 parts by weight of the biomass composition, glucose may be included in a range of 25 parts by weight to 55 parts by weight, 25 parts by weight to 50 parts by weight, 25 parts by weight to 45 parts by weight, 30 parts by weight to 55 parts by weight, 30 parts by weight to 50 parts by weight, 30 parts by weight to 45 parts by weight, 35 parts by weight to 55 parts by weight, 35 parts by weight to 50 parts by weight, or 35 parts by weight to 45 parts by weight, but is not limited thereto.

In addition, based on 100 parts by weight of the biomass composition, xylose may be specifically included in a range of 10 parts by weight to 40 parts by weight, 10 parts by weight to 35 parts by weight, 10 parts by weight to 30 parts by weight, 15 parts by weight to 40 parts by weight, 15 parts by weight to 35 parts by weight, or 15 parts by weight to 30 parts by weight, but is not limited thereto.

In addition, based on 100 parts by weight of the biomass composition, lignin may be specifically included in a range of 10 parts by weight to 35 parts by weight, 10 parts by weight to 30 parts by weight, 10 parts by weight to 25 parts by weight, 15 parts by weight to 35 parts by weight, 15 parts by weight to 30 parts by weight, or 15 parts by weight to 25 parts by weight, but is not limited thereto.

In addition, based on 100 parts by weight of the biomass composition, ash may be specifically included in a range of 1 part by weight to 25 parts by weight, 1 part by weight to 20 parts by weight, 1 part by weight to 15 parts by weight, 3 parts by weight to 25 parts by weight, 3 parts by weight to 20 parts by weight, 3 parts by weight to 15 parts by weight, 5 parts by weight to 25 parts by weight, 5 parts by weight to 20 parts by weight, or 5 parts by weight to 15 parts by weight, but is not limited thereto.

Another aspect of the present disclosure to achieve the above objects provides a method for producing sugar from biomass, comprising (a) a pretreatment step comprising physical pretreatment of biomass; and (b) a step of converting the pretreated biomass composition to sugar, which is subjected to solid-liquid separation by membrane filtration.

The particle size distribution of the physically pretreated biomass may be that D10 is 1 µm to 10 µm, D50 is 10 µm to 30 µm, and D90 is 30 µm to 120 µm, and the physical pretreatment may include attrition mill treatment, but is not limited thereto.

The terms "biomass", "physical pretreatment", "particle size", "density", etc. are the same as described above.

As used herein, the term "solid-liquid separation" refers to separation of a liquid and a solid. In the present disclosure, it may refer to converting biomass, which went through pretreatment, to sugar and obtaining a solid through solid-liquid separation. Further, for the solid-liquid separation, membrane filtration may be performed.

The membrane filtration is a separation process using a semi-permeable membrane to separate two or more components from each other, and this process generally uses a pressure difference between both sides of the membrane as a driving force. The biomass composition of the present disclosure, which is treated by attrition milling, has a high density and a narrow particle size distribution to use membrane filtration.

DETAILED DESCRIPTION OF THE INVENTION

Hereinafter, the constitution and effects of the present disclosure will be described in more detail through examples. These examples are only for illustrating the present disclosure, and the scope of the present disclosure is not limited by the examples.

The physically pretreated biomass composition of the present disclosure has a high density, a low average particle size, and a narrow particle size distribution, and the coarse fibril inherent to herbaceous biomass disappears, resulting in a uniform particle shape, and thus a solid-liquid separation process of biomass compositions can proceed through membrane filtration.

Example 1: Preparation of Physically Pretreated Composition of Herbaceous Biomass In order to prepare a physically pretreated herbaceous biomass composition, the following experiments were performed.

Specifically, herbaceous biomass of corn stover, wheat straw, *Miscanthus sacchariflorus*, and rice straw were physically pretreated by attrition milling, grinder milling, hammer milling, or cutter milling method. The attrition milling was performed for 10 minutes at 300 rpm using an attrition grinder (KHAM-305, Hankook Mineral Powder, Co., Ltd.). In addition, the grinder milling, hammer milling, and cutter milling were performed using a multi-purpose grinder (Multi Mill, RD1-15, 9 グローエンジニアリング). 2 mm screen was used for cutter milling and hammer milling, and the grinder milling was treated by adjusting the clearance to be 50 µm.

Example 2: Measurement of Particle Size Distribution and Density and Composition Analysis of Pulverized Biomass Composition The following experiments were performed to determine the particle size, density and composition of the physically pretreated herbaceous biomass composition.

Specifically, after tapping for 1 minute using 10 g of the physically pretreated composition prepared in Example 1 above, the density was measured by determining its volume (Table 1), and the average particle size of the physically pretreated composition was measured by dry analysis using a particle size analyzer (Particle size Analysis, LS 13 220, BECKMAN COULTER™) (Table 2, and FIGS. 1 to 4). In addition, the components of the biomass treated by attrition milling were analyzed by the method of NREL Procedures LAP-002 (Table 3).

As a result, the density during the attrition milling treatment was 0.5 g/mL or more, and the density during the grinder, hammer, and cutter milling was significantly increased compared to 0.3 g/mL. The average particle size during the attrition milling was 50 μm or less, and the particle size distribution showed a narrow distribution where D10 was 1 μm to 10 μm, D50 was 10 μm to 30 μm, and D90 was 30 μm to 120 μm. Materials having a wide particle size distribution and a low density (0.12 g/mL to 0.18 g/L) are known to be disadvantageous for membrane filtration, and through the high density, low average particle size, and narrow particle size distribution of the attrition milling composition, an increased in flux was predicted compared to other physical pretreatment methods when passing through MF.

TABLE 1

Density of herbaceous biomass depending on grinding method [g/mL]

|  | Corn stover | Wheat straw | Miscanthus sacchariflorus | Rice straw |
| --- | --- | --- | --- | --- |
| Attrition milling | 0.56 | 0.50 | 0.56 | 0.50 |
| Grinder milling | 0.16 | 0.31 | 0.26 | 0.31 |
| Hammer milling | 0.18 | 0.20 | 0.26 | 0.20 |
| Cutter milling | 0.18 | 0.30 | 0.31 | 0.30 |

TABLE 2

Particle size distribution and average particle size of herbaceous biomass depending on grinding method

|  | μm |  | Corn stover | Wheat straw | Miscanthus sacchariflorus | Rice straw |
| --- | --- | --- | --- | --- | --- | --- |
| Attrition milling | Particle size distribution | $d_{10}$ | 5.028 | 1.826 | 4.767 | 1.242 |
|  |  | $d_{50}$ | 22.38 | 12.33 | 23.97 | 10.06 |
|  |  | $d_{90}$ | 77.65 | 39.80 | 114.0 | 37.36 |
|  | Average particle size |  | 36.2 | 19.28 | 48.14 | 17.52 |
| Grinder milling | Particle size distribution | $d_{10}$ | 36.94 | 100.1 | 104.8 | 73.07 |
|  |  | $d_{50}$ | 182.6 | 693.8 | 601.0 | 337.3 |
|  |  | $d_{90}$ | 731.7 | 1579 | 1535 | 1128 |
|  | Average particle size |  | 285.4 | 770.7 | 719.1 | 480.9 |
| Hammer milling | Particle size distribution | $d_{10}$ | 79.93 | 189.7 | 241.9 | — |
|  |  | $d_{50}$ | 464.5 | 843.5 | 848.8 | — |
|  |  | $d_{90}$ | 1419 | 1652 | 1689 | — |
|  | Average particle size |  | 608.9 | 882.3 | 905.6 | — |
| Cutter milling | Particle size distribution | $d_{10}$ | 87.52 | 187.4 | 151.8 | 68.67 |
|  |  | $d_{50}$ | 497.7 | 794.1 | 683.2 | 422.6 |
|  |  | $d_{90}$ | 1422 | 1595 | 1552 | 1106 |
|  | Average particle size |  | 627.6 | 843.5 | 771.4 | 512.8 |

* D10, D50, and D90 are particle sizes of the points where the cumulative curves are 10%, 50%, and 90%, respectively, when the cumulative curves of the particle size distribution are obtained by setting the total weight as 100%

TABLE 3

Composition of attrition-milling treated biomass

|  | Corn stover | Wheat straw | Miscanthus sacchariflorus | Rice straw |
| --- | --- | --- | --- | --- |
| Glucose | 37.5 | 37.1 | 41.6 | 42.9 |
| Xylose | 21.7 | 21.6 | 17.3 | 21.8 |
| Mannose | 0.6 | 0.6 | 0.8 | 0.0 |
| Galactose | 1.6 | 1.1 | 1.9 | 0.0 |
| Arabinose | 2.7 | 2.8 | 3.2 | 2.9 |
| Lignin | 19.3 | 21.0 | 21.7 | 17.5 |
| Ash | 6.3 | 6.3 | 2.6 | 11.6 |
| Others | 10.3 | 9.5 | 10.9 | 3.3 |
| Total | 100.0 | 100.0 | 100.0 | 100.0 |

Example 3: Observation of Particle Shape of Physically Pretreated Biomass Composition The particle shape of the physically pretreated biomass composition was observed using a microscope (Dino-Lite, AM3113, Taiwan) (FIGS. 5 to 8). As a result, for all of the four types (corn stover, wheat straw, Miscanthus sacchariflorus, and rice straw) biomass, the native fibril inherent to the herbaceous biomass disappeared upon the treatment of attrition milling and the particle shape became uniform. However, during the grinder, hammer, and cutter milling treatments, biomass-specific coarse fibrils remained, acicular particles were generated, and the overall particle size and shape were uneven. During MF passage, these acicular particles, fibril, etc. block membrane pores, causing clogging phenomena, process troubles, and deteriorating the separation performance. In addition, biomass solids form a filter cake that makes filtration difficult, and it is presumed that the non-uniform particle shape generated after the grinder, hammer, and cutter milling processes forms a porous cake structure to increase the compressibility of the cake, thereby slowing the membrane filtration passing rate.

Example 4: Measurement of MF Flux of Physically Pretreated Biomass Composition

Flux was measured in order to evaluate the passing rate during MF treatment of the physically pretreated herbaceous biomass. Specifically, after mixing 20 g of the physically pretreated biomass composition and 300 g of water and reacting at 90° C. for 1 hour, solid-liquid separation was performed using MF (F1091, 47 mm, chin by CHMLAB GROUP, USA) flat module. Flux was measured using the amount of a liquid passing through the MF for 10 minutes to confirm the MF passing performance of the physically pretreated biomass composition (Table 4). In addition, after mixing 40 g of the physically pretreated biomass composition and 200 g of water and reacting at 190° C. for 20 minutes, solid-liquid separation was performed using MF (F1091, 47 mm, chm by CHMLAB GROUP, USA) flat module. Flux was measured using the amount of a liquid passing through the MF for 10 minutes to confirm the MF passing performance of the physically pretreated biomass composition (Table 5).

As a result, in both conditions, it was confirmed that for the composition treated by the attrition milling, clogging phenomena did not occur upon passing the MF, and MF passing flux was higher than those of the grinder, hammer, and cutter milling compositions. Therefore, it was confirmed that when the biomass composition treated by the attrition milling of herbaceous biomass was used, MF clogging phenomena did not occur during solid-liquid separation after chemical treatment, and thus the treatment rate significantly increased such that the MF can be used in the biomass process.

TABLE 4

MF flux of physically pretreated
biomass composition (90° C., 1 hr)

| $m^3/m^2hr$ | Corn stover | Wheat straw | Miscanthus sacchariflorus | Rice straw |
|---|---|---|---|---|
| Attrition milling | 1.43 | 0.19 | 1.38 | 0.11 |
| Grinder milling | 0.09 | 0.06 | 0.24 | 0 |
| Hammer milling | 0.12 | 0.07 | 0.73 | 0 |
| Cutter milling | 0.32 | 0.03 | 0.69 | 0 |

TABLE 5

MF flux of physically pretreated biomass
composition (190° C., 20 min)

| $m^3/m^2hr$ | Corn stover | Wheat straw | Miscanthus sacchariflorus | Rice straw |
|---|---|---|---|---|
| Attrition milling | 3.93 | 2.48 | 4.63 | 2.29 |
| Grinder milling | 1.13 | 1.24 | 2.10 | 1.91 |
| Hammer milling | 0.23 | 2.29 | 1.15 | 1.91 |
| Cutter milling | 2.10 | 0.61 | 2.29 | 1.53 |

From the above description, those skilled in the art will appreciate that the present disclosure can be implemented in other specific forms without changing the technical spirit or essential features. In this regard, the embodiments described above are to be understood in all respects as illustrative and not restrictive. The scope of the present disclosure should be construed that all changes or modifications derived from the meaning and scope of the following claims and equivalent concepts rather than the detailed description are included in the scope of the present disclosure.

The invention claimed is:

1. A physically pretreated biomass composition, comprising a particle size distribution in which D10 is 1 μm to 10 μm, D50 is 20 μm to 30 μm, and D90 is 80 μm to 120 μm, wherein a density of the biomass is 0.56 g/mL to 0.6 g/mL, and wherein
   the biomass comprises herbaceous biomass,
   the herbaceous biomass comprises Miscanthus sacchariflorus, and
   the physically pretreated biomass comprises attrition mill treated biomass;
   wherein the composition is capable of producing a membrane flux of at least 4.63 m3/m2.hr when subjected to 190° C. for 20 min under membrane filtration conditions; and
   wherein the composition is configured for membrane filtration treatment in a biomass solid-liquid separation.

2. The physically pretreated biomass composition of claim 1, wherein an average particle size distribution of the biomass is 10 μm to 50 μm.

3. The physically pretreated biomass composition of claim 1, wherein the biomass composition comprises glucose, xylose, lignin, and ash.

4. A method for producing sugar from the physically pretreated biomass composition of claim 1, comprising:
   (a) a pretreatment step comprising physical pretreatment of biomass; and
   (b) a step of converting the physically pretreated biomass composition to sugar, which is subjected to solid-liquid separation by membrane filtration.

5. The physically pretreated biomass composition of claim 1, wherein a glucose content in the physically pretreated biomass composition is in a range of 25 parts by weight to 55 parts by weight based on 100 parts by weight of the biomass composition.

6. The physically pretreated biomass composition of claim 1, wherein a xylose content in the physically pretreated biomass composition is in a range of 10 parts by weight to 40 parts by weight based on 100 parts by weight of the biomass composition.

7. The physically pretreated biomass composition of claim 1, wherein a lignin content in the physically pretreated biomass composition is in a range of 10 parts by weight to 35 parts by weight based on 100 parts by weight of the biomass composition.

8. The physically pretreated biomass composition of claim 1, wherein an ash content in the physically pretreated biomass composition is in a range of 1 part by weight to 25 parts by weight based on 100 parts by weight of the biomass composition.

9. The physically pretreated biomass composition of claim 1, wherein the D10 of the biomass is 1.242 μm or higher and 5.028 μm or lower.

10. The physically pretreated biomass composition of claim 1, wherein the D50 of the biomass is 20 μm or higher and 23.97 μm or lower.

11. The physically pretreated biomass composition of claim 1, wherein the D90 of the biomass is 80 μm or higher and 114.0 μm or lower.

12. The physically pretreated biomass composition of claim 1, wherein a glucose content in the physically pretreated biomass composition is in a range of 35 parts by weight to 50 parts by weight based on 100 parts by weight of the biomass composition.

13. The physically pretreated biomass composition of claim 1, wherein a xylose content in the physically pretreated biomass composition is in a range of 15 parts by weight to 30 parts by weight based on 100 parts by weight of the biomass composition.

14. The physically pretreated biomass composition of claim 1, wherein a lignin content in the physically pretreated biomass composition is in a range of 15 parts by weight to 25 parts by weight based on 100 parts by weight of the biomass composition.

15. The physically pretreated biomass composition of claim 1, wherein an ash content in the physically pretreated biomass composition is in a range of 1 part by weight to 15 parts by weight based on 100 parts by weight of the biomass composition.

16. The physically pretreated biomass composition of claim 1, wherein the biomass composition comprises glucose and lignin.

* * * * *